United States Patent
Shimazu

[11] Patent Number: 5,832,813
[45] Date of Patent: Nov. 10, 1998

[54] DEVICE FOR MAKING ROLLED SUSHI

[76] Inventor: Yoshinori Shimazu, c/o Kabushiki Kaisha Shimazukikaiseisakkusho, 7-7, Mitejima 1-chome, Nishiyodogawa-ku, Osaka City, Osaka, Japan

[21] Appl. No.: 3,654

[22] Filed: Jan. 7, 1998

[30] Foreign Application Priority Data

Nov. 19, 1997 [JP] Japan ................................. 9-336353

[51] Int. Cl.⁶ .............................. A21C 3/06; A21C 9/00; A23P 1/00; A47J 43/20
[52] U.S. Cl. .................... 99/450.2; 99/450.1; 99/450.6; 425/110; 425/112; 425/308
[58] Field of Search .............. 99/353–355, 485, 99/494, 450.1, 450.2, 450.6, 450.7; 425/327, 297, 403.1, 204, 225, 307, 308, 315, 319, 371, 110, 112; 426/272, 512, 513

[56] References Cited

U.S. PATENT DOCUMENTS

| | | | |
|---|---|---|---|
| 4,340,342 | 7/1982 | Kim | 425/307 X |
| 4,516,487 | 5/1985 | Madison et al. | 99/450.6 |
| 4,552,523 | 11/1985 | Suzuki | 99/450.1 X |
| 4,556,379 | 12/1985 | Ikishima | 425/308 X |
| 4,597,731 | 7/1986 | Suzuki | 425/307 X |
| 4,637,304 | 1/1987 | Suzuki | 99/450.2 |
| 4,691,627 | 9/1987 | Roberts | 99/450.6 |
| 4,741,263 | 5/1988 | Ueno et al. | 99/450.2 |
| 5,482,453 | 1/1996 | Shimizu | 425/408 X |
| 5,634,396 | 6/1997 | Isobe | 99/450.6 |

FOREIGN PATENT DOCUMENTS 2086507  3/1990  Japan ................................. 99/450.2

*Primary Examiner*—Timothy F. Simone
*Attorney, Agent, or Firm*—Curtis L. Harrington

[57] ABSTRACT

The present invention provide a device for making rolled sushi to make effectively not only traditional rolled sushi but also the so called "California-style" rolled sushi of which laver and ingredients are rolled with vinegared rice. The device includes a hopper into which vinegared rice is thrown, a first conveyor arranged below the hopper, a dropping supply device to drop the vinegared rice conveyed by the first conveyor successively by a uniform amount, a second conveyor arranged below the dropping supply device, a cutting mechanism which cuts the vinegared rice conveyed successively by the second conveyor into pieces of a uniform length, and a forming mechanism provided at a downstream end of the second conveyor which forms the vinegared rice cut by the cutting mechanism into rolled sushi, the forming mechanism having two upper rollers arranged at a substantially same height, a lower roller arranged below the middle of the upper rollers, a wire conveyor put around an outer circumference of the three rollers, dead weight rollers arranged equidistantly apart from the upper rollers on the wire conveyor, and an open-shut mechanism to bring the upper rollers close to and apart from each other.

16 Claims, 10 Drawing Sheets

DEVICE FOR MAKING ROLLED SUSHI

FIELD OF THE INVENTION

This invention relates to a device for making rolled sushi and has an object to provide a device for efficiently making the so-called "California-style" rolled sushi of which laver is rolled with ingredients into vinegared rice, to say nothing of traditional rolled sushi.

PRIOR ART

In general, rolled sushi is made by putting vinegared cooked rice and ingredients on spread laver, rolling the vinegared rice and ingredients with the laver, pressing the circumference to shape the rolled sushi and cutting the rolled sushi with a knife. Making rolled sushi manually, however, causes a problem such as fatigue of workers due to a long-time working so that there naturally is a limit to make a great deal of rolled sushi for a long time.

In view of the aforesaid situation, there exists a device to make rolled sushi automatically by placing laver on a belt conveyor, providing vinegared rice on the laver, putting ingredients on the rice, rolling the laver from the both sides to form rolled sushi of a stick shape and cutting the rolled sushi into pieces of a uniform length.

The above mentioned device is suitable to make traditional rolled sushi of which vinegared rice is arranged inside rolled laver, however, the so-called "California-style" rolled sushi of which laver is rolled with ingredients into vinegared rice can not be made with the prior device.

The problem to be solved is to provide a device for efficiently making the so-called "California-style" rolled sushi of which laver is rolled with ingredients into vinegared rice, to say nothing of traditional rolled sushi.

SUMMARY OF THE INVENTION

To solve the above mentioned problems, the present invention provides a device for making rolled sushi comprising a hopper into which vinegared rice is thrown, a first conveyor arranged below the hopper, a supply device to drop the vinegared rice conveyed by the first conveyor successively by a uniform amount, a second conveyor arranged below the supply device, a cutting mechanism which cuts the vinegared rice conveyed successively by the second conveyor into pieces of a uniform length, and a forming mechanism provided at a downstream end of the second conveyor which forms the vinegared rice cut by the cutting mechanism into rolled sushi, the forming mechanism comprising two upper rollers arranged at a substantially same height, a lower roller arranged below the middle of the upper rollers, a wire conveyor put around an outer circumference of the three rollers, dead weight rollers arranged equidistantly apart from the upper rollers on the wire conveyor, and an open-shut mechanism to bring the upper rollers close to and apart from each other. With the present device, not only traditional rolled sushi but also the so called "California-style" rolled sushi in which laver and ingredients are rolled with vinegared rice can be made.

Figure 1:
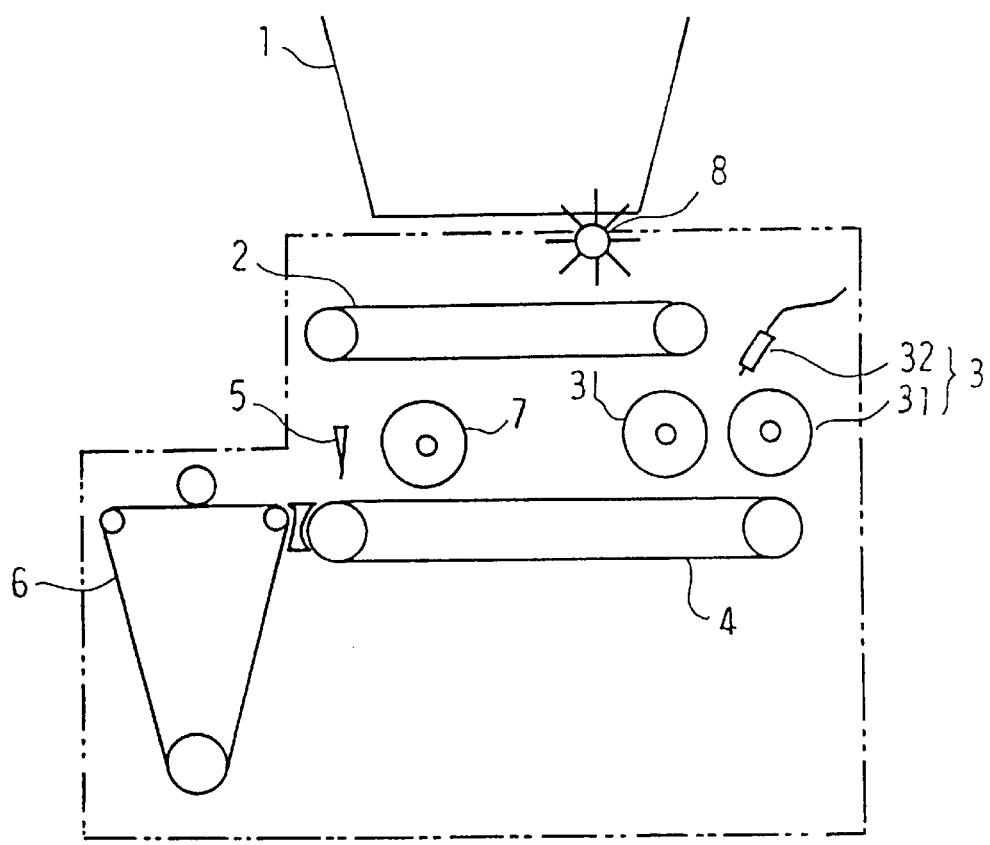
FIG. 1 is a schematic illustration showing a whole structure of a device for making rolled sushi relating to the present invention.

Description of Symbols
1 . . . Hopper
2 . . . First Conveyor
3 . . . Dropping Supply Means
31 . . . Roller
32 . . . Identification Sensor
4 . . . Second Conveyor
5 . . . Cutting Mechanism
6 . . . Forming Mechanism
61 . . . Upper Roller
62 . . . Lower Roller
63 . . . Wire Conveyor
64 . . . Dead Weight Conveyor
65 . . . Open-Shut Mechanism
66 . . . Joint Bar
67a . . . Rotation Axis
67b . . . Rotation Axis
68a . . . Gear
68b . . . Gear
69 . . . Operation Bar
6a . . . Spring
7 . . . Leveling Means
9 . . . Pressing Mechanism

DETAILED DESCRIPTION OF THE INVENTION

Preferred embodiments of a device for making rolled sushi relating to the present invention will be described hereinafter referring to the drawings.

FIG. 1 is a schematic illustration showing a whole structure of a device for making rolled sushi relating to the present invention.

The present device is provided with a hopper (1) into which vinegared rice is thrown, a first conveyor (2) arranged below the hopper (1), a dropping supply means (3) to drop a uniform amount of the vinegared rice conveyed by the first conveyor (2), a second conveyor (4) arranged below the dropping supply device (3), a cutting mechanism (5) to cut the vinegared rice conveyed by the second conveyor (4) into pieces of a uniform length, and a forming mechanism (6) arranged at a downstream end of the second conveyor (4) to form the vinegared rice cut by the cutting mechanism (5) into rolled sushi.

A stirring impeller (8) is provided below the hopper (1) so that the dropped vinegared rice is conveyed by the first conveyor (2) after the rice is loosened by the impeller (8).

The dropping supply device (3) comprises two rollers (31) which rotate inwardly to each other and an identification sensor (32) which identifies vinegared rice between the rollers (31) and drops the vinegared rice conveyed by the first conveyor (2) through the gap between the rollers (31).

Figure 2:
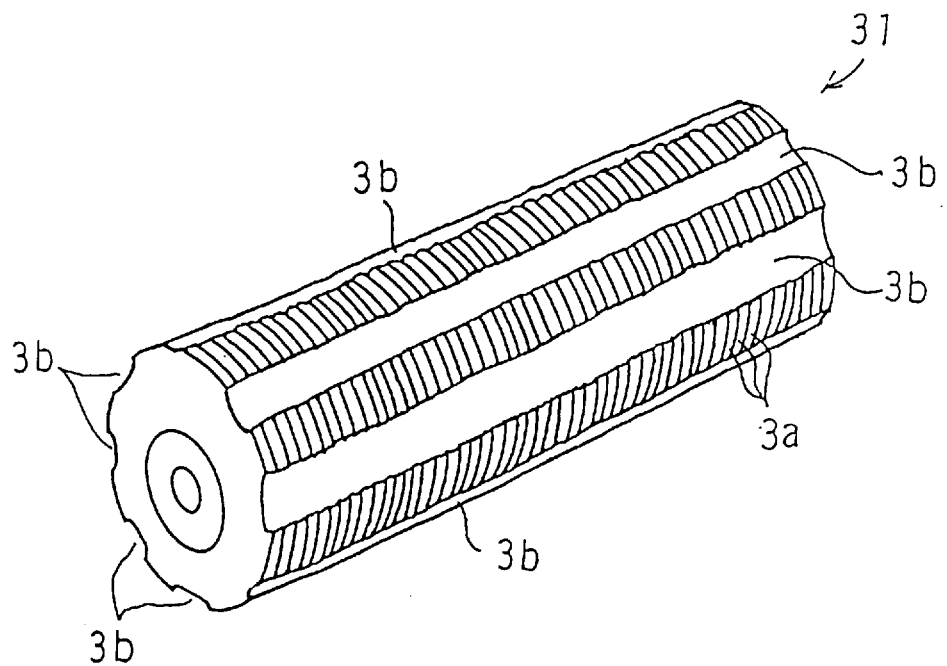
FIG. 2 is an outer view of a roller forming a dropping supply means.

Each of the rollers (31) has annular grooves (3a) extending circumferentially and recesses (3b) extending along the axial length of the roller on its outer circumferential surface. The recesses (3b) are formed at the rate of eight per a circumference at a 45 degree angle from other in FIG. 2. In other embodiments, the recesses (3b) can be formed at any preferable rate such as four, six or ten per a circumference. The two rollers are arranged to rotate inwardly to each other in the manner that one of the axial recesses of one of the rollers faces one of the axial recess of the other roller every one-eighth of a rotation.

The identification sensor (32) is mounted to identify a big lump of vinegared rice so that the identification sensor (32) identifies a big lump of vinegared rice to stop an operation of the present device when the vinegared rice is not loosened sufficiently and dropped.

Figure 3:
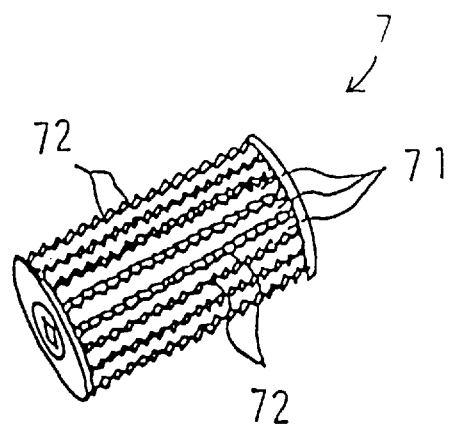
FIG. 3 is an outer view of a roller forming a leveling means.

A leveling roller (7) is provided between the dropping supply device (3) and the cutting mechanism (5) to level the vinegared rice conveyed by the second conveyor (4). The leveling roller (7) comprises a roller mounted rotatably above the second conveyor (4) with a space left between the roller and the second conveyor (4). On the outer circumferential surface of the roller, axial recesses (71) spacing each other by a uniform distance and circumferential grooves (72) are formed as shown in FIG. 3.

Figure 4:
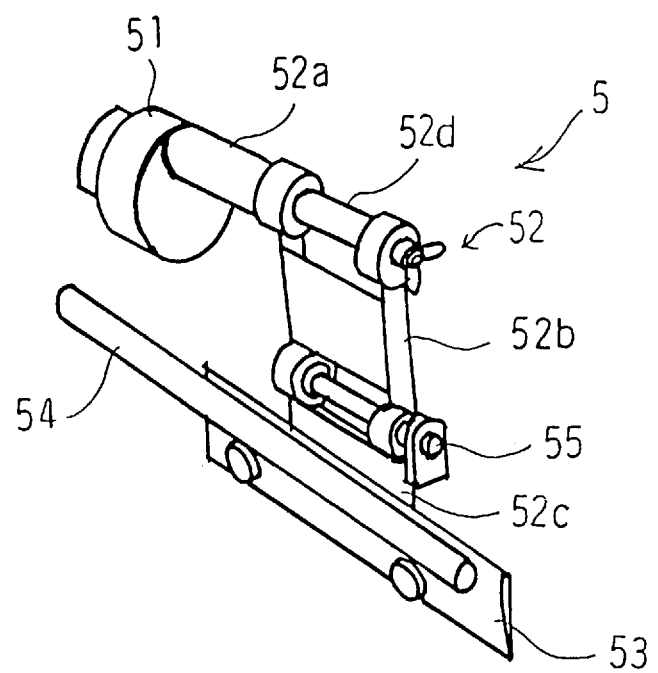
FIG. 4 is an outer view of a cutting mechanism.

FIG. 4 is an outer view of the cutting mechanism (5).

The cutting mechanism (5) is provided above a downstream end of the second conveyor (4) as shown in FIG. 1 to cut the vinegared rice conveyed successively by the second conveyor (4) into pieces of a uniform length.

The cutting mechanism (5) comprises a rotating cam (51), a connector (52) mounted to the rotating cam (51), a cutting edge (53) mounted to a lower end of the connector (52) and a control bar (54) to control horizontal movements of the cutting edge (53).

The connector (52) comprises tick member (52a) mounted to the rotating cam (51) at a portion out of the central, an intermediate member (52b) connected with the stick member (52a) through an axle (52d), a lower member (52c) connected with the intermediate member (52b) through an axle (55) of which lower end the cutting edge (53) is mounted to.

In the aforesaid cutting mechanism (5), when the rotating cam (51) is rotated at a uniform speed, movements of the members (52a) (52b) of the connector (52) are transferred as only vertical movements to the lower member (52c) so that the cutting edge (53) moves vertically at regular intervals. Thus the vinegared rice successively conveyed by the second conveyor (4) is cut into pieces of a uniform length by the intermittent vertical movements of the cutting edge (53) to be supplied to the forming mechanism (6) in the next step.

Figure 5:
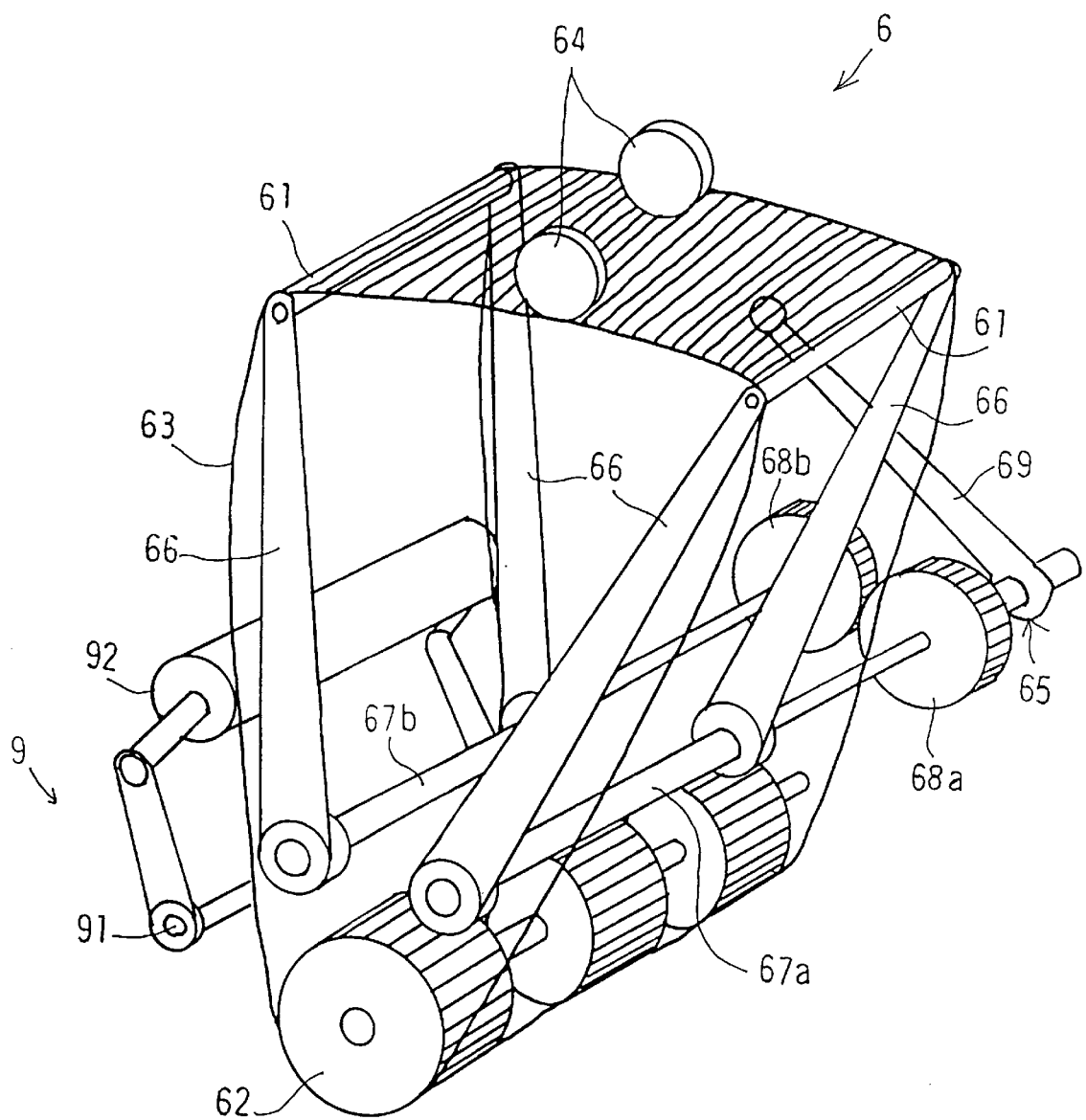
FIG. 5 is a schematic illustration showing a whole structure of a forming mechanism.
Figure 6:
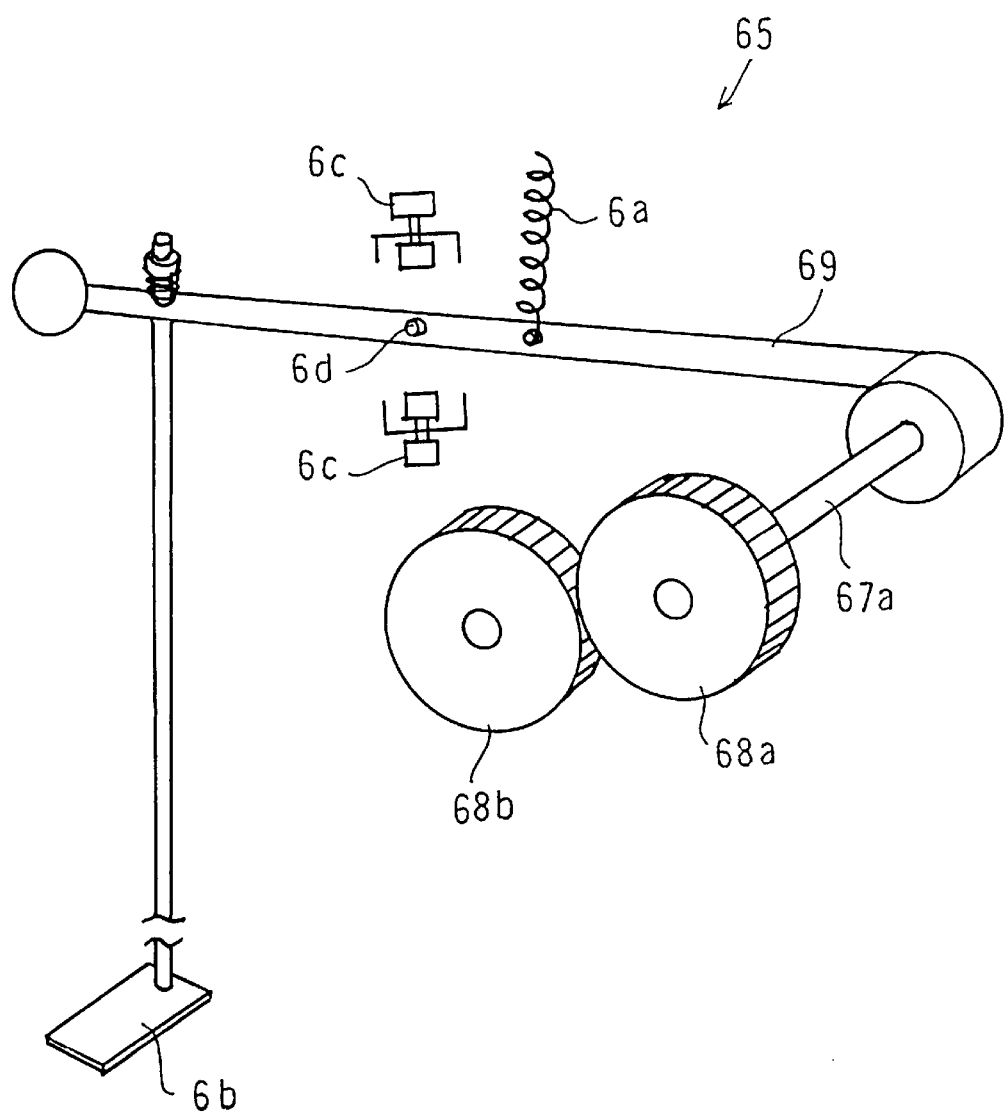
FIG. 6 is a schematic illustration to explain an open-shut mechanist

FIG. 5 is a schematic illustration showing a whole structure of the forming mechanism (6), and FIG. 6 is a schematic illustration to explain an open-shut mechanism (65).

The forming mechanism (6) comprises two upper rollers (61) arranged at a substantially same height, a lower roller (62) arranged below the middle of the upper rollers (61), a wire conveyor (63) put around an outer circumference of the three rollers, dead weight rollers (64) arranged equidistantly apart from the upper rollers (61) on the wire conveyor (63) and the open-shut mechanism (65) to bring the upper rollers close to and apart from each other.

One of the upper rollers (61) is connected with a rotating axle (67a) through joint bars (66) and the other is connected with a rotating axle (67b) through joint bars (66). The lower roller (62) and the rotating axles (67a) (67b) are rotatably fixed to two reverse-triangular plates (not shown) at both ends to keep their positions.

Gears (68a) (68b) engaging each other are mounted respectively about the rotating axles (67a) (67b) and an operating bar (69) is connected with an end of the rotating axle (67a). As shown in FIG. 6, the operation bar (69) is always biased upwardly by a spring (6a) and the other end which is not connected with the rotating axle (67a) is connected with a foot pedal (6b).

(6c) are limiters to control vertical movements of the operating bar (69) to the extent that a project (6d) formed midway on the operating bar (69) abutts the upper and lower limiters (6c).

Working of the above mentioned open-shut mechanism (65) will be described hereinafter.

The operating bar (69) is usually biased upwardly by the spring (6a) so that the upper rollers (61) are positioned apart from each other as shown in FIG. 5.

When an operator steps on the foot pedal (6b) or pushes down the operating bar (69) with the hand, the rotating axle (67a) connected with the operating bar (69) rotates anticlockwise to rotate the gear (68a) anticlockwise so that the gear (68b) engaged with the gear (68a) rotates clockwise to rotate the rotating axle (67b) clockwise.

Figure 7:
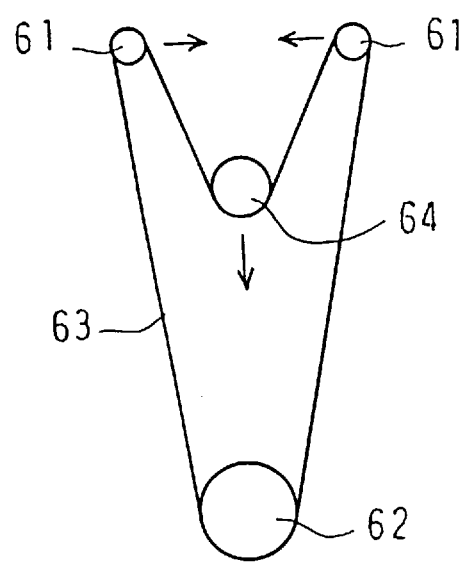
FIG. 7 is an explanation view to explain working of the open-shut mechanism.

Thus the rotating axles (67a) (67b) rotates inwardly to each other so that the upper rollers (61) connected through the joint bars (66) with the rotating axles (67a) (67b) come close to each other. Then the wire conveyor taut between the upper rollers (61) becomes loose and falls down with the dead weight rollers (64) due to the weight of the rollers (64) as shown in FIG. 7.

A pressing mechanism (9) is provided externally of the wire conveyor (63) as shown in FIG. 5. The pressing mechanism (9) comprises a pivot axle (91) and a pressing roller (92) mounted to the pivot axle (91) to press the wire conveyor (63) from an exterior side of the wire conveyor (63) above the lower roller (62).

A method for making rolled sushi using the present device will be described hereinafter.

Vinegared rice is thrown into the hopper (1) and loosen by the stirring impeller (8) to be conveyed by the first conveyor (2).

The vinegared rice conveyed by the first conveyor (1) is dropped onto the second conveyor (4) through the gap between the two rollers (31) forming the dropping supply device (3) which rotate inwardly to each other.

The rollers (31) rotate in the manner that, when the vinegared rice is dropped, each one recess (3b) formed on the rollers (31) turns diagonally upward and faces each other so that the vinegared rice is received within the recesses (3b) to prevent grains of the vinegared rice from being crushed and the annular grooves (3a) also prevent grains of the vinegared rice dropped out of the recesses (3b) from being crushed.

The vinegared rice dropped from the dropping supply means (3) is conveyed by the second conveyor (4) and leveled by the leveling roller (7). The axial recesses (71) and the circumferential grooves (72) are formed on the roller forming the leveling roller (7) to prevent grains of the vinegared rice from being crashed by the roller.

As the rotating cam (51) rotates, the cutting edge (53) is driven to move at regular intervals so that the vinegared rice successively conveyed by the second conveyor (4) is cut into pieces of a uniform length by the cutting mechanism (5) to be supplied to the forming mechanism (6) in the next step.

Figure 8:
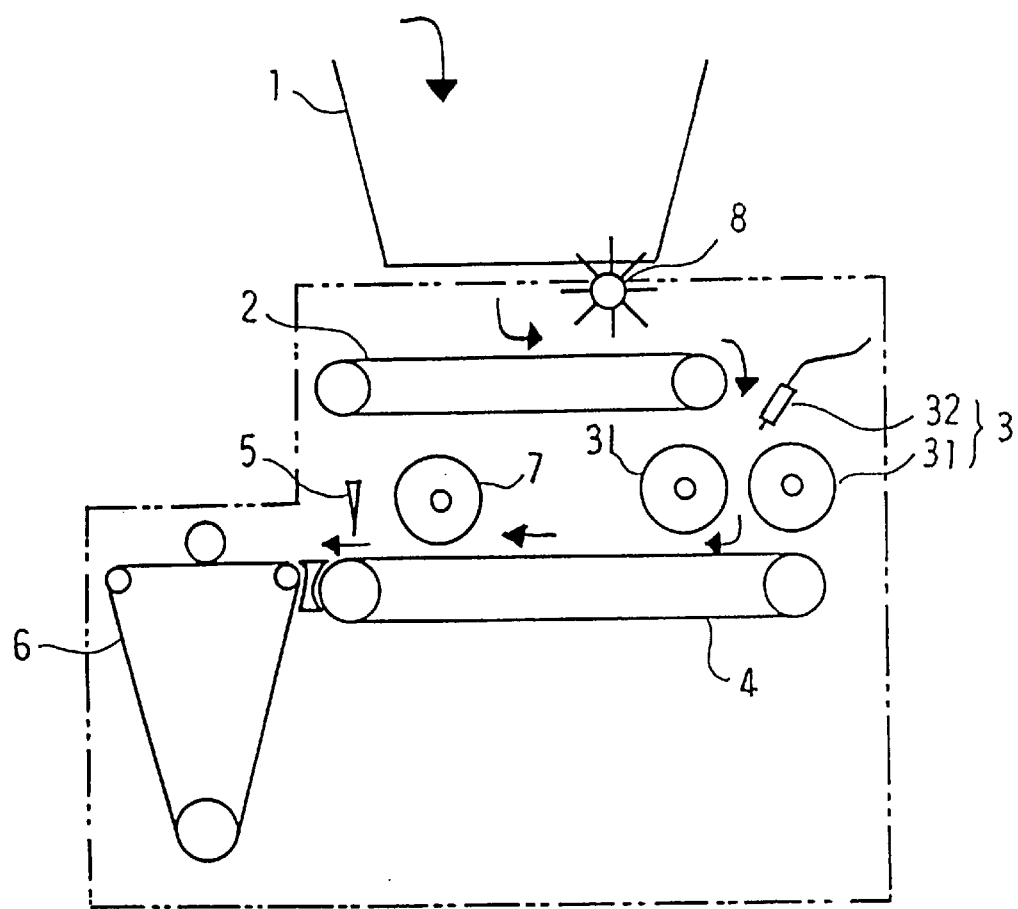
FIG. 8 is an explanation view showing a flow of vinegared rice.

FIG. 8 shows a flow of the vinegared rice described above by arrows.

The forming mechanism (6) forms a uniform amount of the vinegared rice conveyed from the prior step into rolled sushi. Both of traditional rolled sushi and "California-style" rolled sushi can be made with the present device and how to make traditional rolled sushi will be first described hereinafter.

Figure 9:
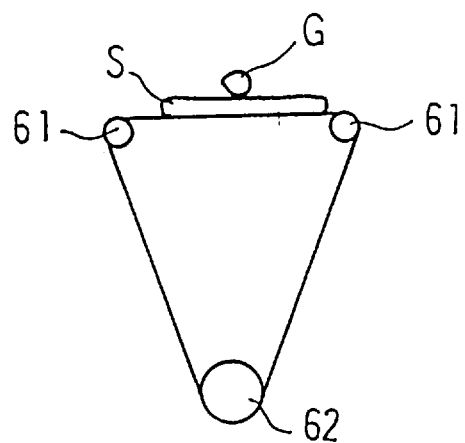
FIG. 9 is a view to explain how to make traditional rolled sushi with a device for making rolled sushi relating to the present invention.
Figure 10:
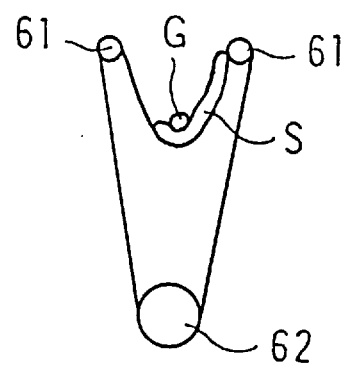
FIG. 10 is a view to explain how to make traditional rolled sushi with a device for making rolled sushi relating to the present invention.
Figure 11:
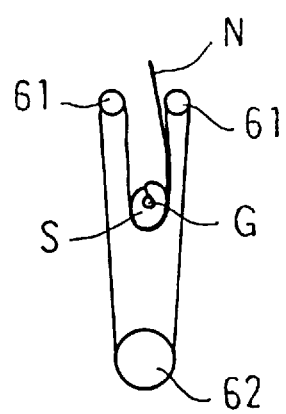
FIG. 11 is a view to explain how to make traditional rolled sushi with a device for making rolled sushi relating to the present invention.

In making of traditional rolled sushi, ingredients (G) are placed on the vinegared rice (S) on the wire conveyor (63) which has been cut into pieces of a uniform length and conveyed to the wire conveyor (63). (cf. FIG. 9) Then an operator steps on the foot pedal (6b) or push down the operating bar (69) to bring the two upper rollers (61) close each other so that the wire conveyor (63) taut between the roller (61) falls down due to the weight of the dead weight rollers (not shown) to start rolling the ingredients (G) with the vinegared rice (S). (cf. FIG. 10) A sheet of laver (N) is inserted along the wire conveyor (63) just before the ingredients (G) are rolled up with the vinegared rice (S). (cf. FIG. 11)

Figure 12:
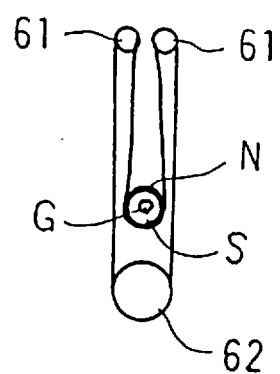
FIG. 12 is a view to explain how to make traditional rolled sushi with a device for making rolled sushi relating to the present invention.

Thus the ingredients (G) are rolled completely in the vinegared rice with the sheet of laver (N) covering entirely an outer circumference of the vinegared rice to accomplish traditional rolled sushi. (cf. FIG. 12)

The accomplished rolled sushi can be readily taken out by releasing the foot from the foot pedal (6b) or the hand from the operating bar (69) to rise the wire conveyor (63) hang between the two upper rollers (61).

Figure 13:
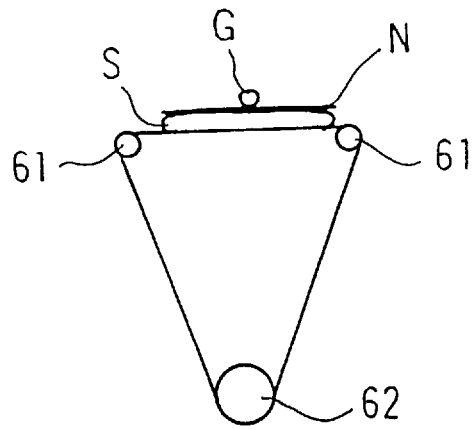
FIG. 13 is a view to explain how to make "California-style" rolled sushi with a device for making rolled sushi relating to the present invention.

In making of "California-style" rolled sushi, a sheet of laver (N) and ingredients (G) are placed on the vinegared rice (S) on the wire conveyor (63) which has been cut into pieces of a uniform length and conveyed to the wire conveyor (63). (cf. FIG. 13)

Figure 14:
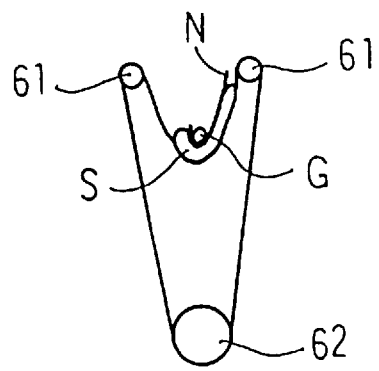
FIG. 14 is a view to explain how to make "California-style" rolled sushi with a device for making rolled sushi relating to the present invention.
Figure 15:
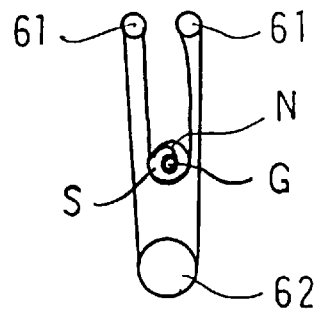
FIG. 15 is a view to explain how to make "California-style" rolled sushi with a device for making rolled sushi relating to the present invention.

Then an operator steps on the foot pedal (6b) or push down the operating bar (69) so that the wire conveyor (63) taut between the rollers (61) falls down in the same manner as described above to start rolling the sheet of laver (N) and the ingredients (G) with the vinegared rice (S). (cf. FIG. 14) Thus the so-called "California-style" rolled sushi of which the sheet of laver (N) and ingredients (G) are rolled with the vinegared rice (S) is accomplished. (cf. FIG. 15)

When accomplished rolled sushi is not sufficiently shaped by the aforesaid steps, it can be further shaped by pressing an exterior side of the wire conveyor (63) with the pressing mechanism (9) from diagonal above to make sufficiently rolled sushi.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A device for making rolled sushi comprising:
   a hopper for accepting vinegared rice;
   a first conveyor arranged below the hopper;
   dropping supply means for dropping the vinegared rice conveyed by said first conveyor successively by a uniform amount;
   a second conveyor arranged below said dropping supply means;
   a cutting mechanism for cutting the vinegared rice conveyed successively by said second conveyor into pieces of a uniform length; and
   a forming mechanism provided at a downstream end of the second conveyor for forming the vinegared rice cut by said cutting mechanism into rolled sushi, said forming mechanism comprising two upper rollers arranged at a substantially same height, a lower roller arranged below the middle of the upper rollers, a wire conveyor put around an outer circumference of the three rollers, dead weight rollers arranged equidistantly apart from the upper rollers on the wire conveyor, and a roller movement mechanism to bring the upper rollers close to and apart from each other.

2. A device for making rolled sushi as set forth in claim 1, wherein said roller movement mechanism comprising two rotating axles connected through joint bars respectively with the two upper rollers, two gears mounted respectively around the two rotating axles which engage each other, and an operating bar biased upwardly which is connected with one of the rotating axles.

3. A device for making rolled sushi as set forth in claim 1, wherein a pressing mechanism is provided above the lower roller of said forming mechanism to press the wire conveyor from an exterior side of the wire conveyor.

4. A device for making rolled sushi as set forth in claim 2, wherein a pressing mechanism is provided above the lower roller of said forming mechanism to press the wire conveyor from an exterior side of the wire conveyor.

5. A device for making rolled sushi as set forth in claim 1, wherein a leveling means is provided between said dropping supply means and said cutting mechanism for leveling the vinegared rice which is conveyed by said second conveyor.

6. A device for making rolled sushi as set forth in claim 2, wherein a leveling means is provided between said dropping supply means and said cutting mechanism for leveling the vinegared rice which is conveyed by said second conveyor.

7. A device for making rolled sushi as set forth in claim 3, wherein a leveling means is provided between said dropping supply means and said cutting mechanism for leveling the vinegared rice which is conveyed by said second conveyor.

8. A device for making rolled sushi as set forth in claim 4, wherein a leveling means is provided between said dropping supply means and said cutting mechanism for leveling the vinegared rice which is conveyed by said second conveyor.

9. A device for making rolled sushi as set forth in claim 1, wherein said supply means comprises two rollers which rotate inwardly to each other and an identification sensor for identifying the vinegared rice between the rollers, and for dropping the vinegared rice conveyed by said first conveyor through the gap between the rollers.

10. A device for making rolled sushi as set forth in claim 2, wherein said supply means comprises two rollers which rotate inwardly to each other and an identification sensor for identifying the vinegared rice between the rollers, and for dropping the vinegared rice conveyed by said first conveyor through the gap between the rollers.

11. A device for making rolled sushi as set forth in claim 3, wherein said supply means comprises two rollers which rotate inwardly to each other and an identification sensor for identifying the vinegared rice between the rollers, and for dropping the vinegared rice conveyed by said first conveyor through the gap between the rollers.

12. A device for making rolled sushi as set forth in claim 4, wherein said supply means comprises two rollers which rotate inwardly to each other and an identification sensor for identifying the vinegared rice between the rollers, and for dropping the vinegared rice conveyed by said first conveyor through the gap between the rollers.

13. A device for making rolled sushi as set forth in claim 5, wherein said supply means comprises two rollers which rotate inwardly to each other and an identification sensor for identifying the vinegared rice between the rollers, and for dropping the vinegared rice conveyed by said first conveyor through the gap between the rollers.

14. A device for making rolled sushi as set forth in claim 6, wherein said supply means comprises two rollers which rotate inwardly to each other and an identification sensor for identifying the vinegared rice between the rollers, and for dropping the vinegared rice conveyed by said first conveyor through the gap between the rollers.

15. A device for making rolled sushi as set forth in claim 7, wherein said supply means comprises two rollers which rotate inwardly to each other and an identification sensor for identifying the vinegared rice between the rollers, and for identifying the vinegared rice conveyed by said first conveyor through the gap between the rollers.

16. A device for making rolled sushi as set forth in claim 8, wherein said supply means comprises two rollers which rotate inwardly to each other and an identification sensor for identifying the vinegared rice between the rollers, and for dropping the vinegared rice conveyed by said first conveyor through the gap between the rollers.

* * * * *